H. HACKSTEDDE.
MIXING MACHINE.
APPLICATION FILED MAR. 16, 1916.
1,290,980.
Patented Jan. 14, 1919.
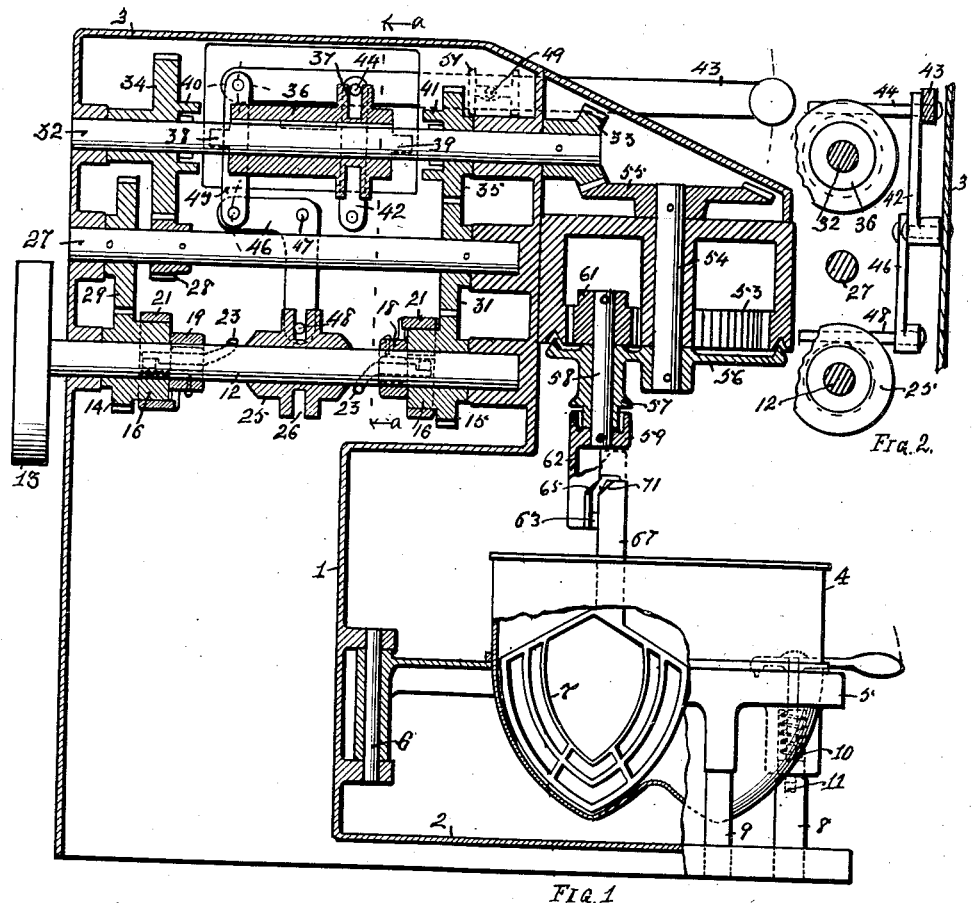
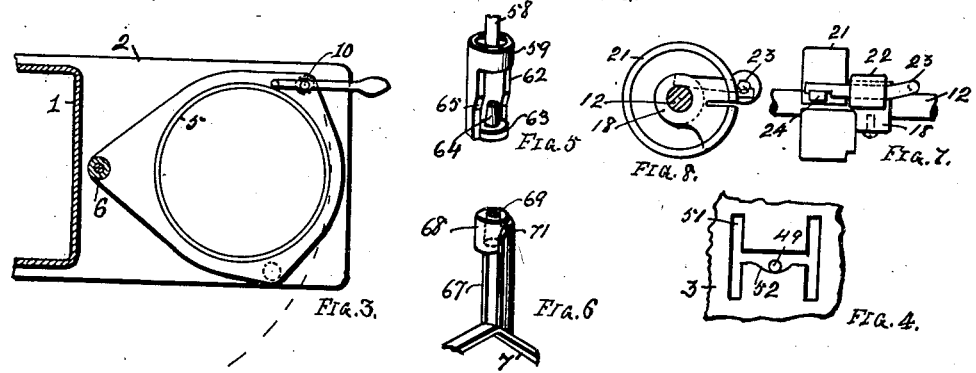
WITNESSES,
Phebe A. Carr.
Esther A. Chapman.
Herbert Hackstedde, INVENTOR,
By Robert S. Carr,
Attorney.

UNITED STATES PATENT OFFICE.

HERBERT HACKSTEDDE, OF CINCINNATI, OHIO, ASSIGNOR TO THE CENTURY MACHINE COMPANY, OF CINCINNATI, OHIO, A CORPORATION OF OHIO.

MIXING-MACHINE.

1,290,980.   Specification of Letters Patent.   Patented Jan. 14, 1919.

Application filed March 16, 1916. Serial No. 84,750.

*To all whom it may concern:*

Be it known that I, HERBERT HACKSTEDDE, a citizen of the United States, residing at Cincinnati, Hamilton county, Ohio, have invented a new and useful Improvement in Mixing-Machines, of which the following is a specification.

This invention is a mixing machine, and is primarily designed for the use of bakers in mixing dough, both bread and cake, and is also capable of use in mixing butter and sugar.

An important object of the invention is to permit unlimited retarding of the beater without interrupting the operation of the driving mechanism, whereby there is no splashing of the dough nor injury to the operating mechanism should the beater meet with some obstruction in the dough.

A further object of the invention is to insure the proper relation of the beater to the bowl without involving mental and mechanical operations for the adjustment of the beater, whereby there is no possibility of the beater being brought into contact with the bowl and thereby worn and impaired to the detriment of the dough or other material undergoing the mixing action.

A still further object of the invention is to enable the proper operation of the beater and driving means in opposite directions, whereby care need not be taken to see that the mixer is coupled up to a prime mover in such a manner as to be driven in a single predetermined direction.

It is also an object of the invention to provide for gradually starting and also gradually stopping the operation of the beater, thereby to prevent splashing of the dough or other material under treatment.

Another object of the invention is to provide for obtaining definite predetermined beater speeds, and also to provide for selectively changing the speed of the beater to any of the predetermined speeds, thereby to adapt the mixer to materials of different character, and to obtain the desired beater speed at different stages of the mixing operation; to provide in combination a laterally swinging bowl support, a beater depending in fixed vertical relation thereto and a frictional drive for the gear connections that actuate the beater whereby the power may be applied gradually as no means are provided for adjusting the beater, when in action, to different depths within the batch in the bowl; and to provide simple and durable construction and assemblage of the various members for securing facility of operation and efficiency of action. These objects may be attained in the following described manner, as illustrated in the accompanying drawings, in which:—

Figure 1 is a vertical section with parts broken away of a mixing machine embodying my improvements; Fig. 2 a transverse section on the line *a—a* of Fig. 1; Fig. 3 a plan of the hinged bowl supporting ring; Fig. 4 an elevation of a portion of the gear casing showing the H shaped slot for the movement therein of a pin on the clutch shifting lever; Figs. 5 and 6 perspective views of the coöperating members for detachably engaging the beater with the planet shaft; Figs. 7 and 8 respective side and end elevations of the friction clutches.

In the drawings, 1 represents the vertical column supported on the base 2 and surmounted by the casing 3 wherein the change speed gears may be inclosed. The bowl 4 may be removably supported in the ring support 5 which is connected to the column in fixed vertical position by means of the hinge 6 whereby it is movable in a horizontal plane into its normal operating position under the beater 7 or to either side, for the convenient removal or implacement of the bowl therein. Posts 8 and 9 serve to rigidly support said ring when in the operative position, and the spring actuated detent pin 10 on the support is adapted to engage with the hole 11 formed in the top of the post 8 for locking the support immovable thereon during the mixing operation.

The driving shaft 12 journaled in the casing is provided with the driven pulley 13 and with the loose spur gears 14 and 15 each being formed with an extended hub 16 to serve as friction clutch members. Collars 18 and 19 secured on said shaft are each provided with a friction ring 21 and with a boss 22 wherein the curved cam levers 23 are journaled and in movable engagement with the lips 24 on the respective rings for contracting them into frictional engagement with the hubs 16 concentric therein. The sleeve 25 loosely mounted on shaft 12 between the friction clutches and movable longitudinally on said shaft is formed with an annular groove 26 and with tapering ends for movably engaging with and turning the cam levers 23 in an outward direction for frictionally engaging the corresponding clutch members.

The intermediate shaft 27 journaled in the casing is provided with the pinion 28 and with the differential gears 29 and 31 in engagement with the respective gears 14 and 15 on the driving shaft. The driven shaft 32 journaled in the casing is provided with the bevel pinion 33 and with the loose gears 34 and 35 in engagement respectively with the pinion 28 and gear 31 on the intermediate shaft. The sleeve 36 splined on the driven shaft 32 is formed with an annular groove 37 and with positive clutch members 38 and 39 adapted to detachably engage with the corresponding clutch members 40 and 41 on the adjacent ends of the gears 34 and 35.

A link 42 is pivotally secured at one end on the wall of the casing and the shifting lever 43 is fulcrumed at an intermediate point on the opposite end of said link by means of the rod 44 which is extended into movable engagement with the annular groove 37 formed in sleeve 36. A link 45 is pivotally connected at its respective ends with the rear end of the shifting lever and with one leg of the bell crank lever 46 which is pivotally secured to the wall of the casing at a fixed point 47. The rod 48 projects laterally from the other leg of said lever into movable engagement with the annular groove 26 formed in the sleeve 25. A pin 49 projects laterally from the forward portion of the shifting lever into movable engagement with the H shaped slot 51 which may be formed in the adjacent wall of the casing. The lower wall of the horizontal portion of said slot is formed with a curved depression or notch 52 wherein the pin 49 may be maintained by the gravity of the lever, when in an intermediate longitudinal position with the clutch members for the gear 14 in slight frictional engagement to turn the intermediate shaft and the gears 34 and 35 on the driven shaft sufficiently for bringing the clutch members 40 and 41 thereon into position for engagement with the corresponding clutch members on the sleeve 36 by means of the longitudinal movement of the shifting lever. After the engagement of either of the gears 34 or 35 with the sleeve 36 has been effected in this manner the shifting lever may be moved vertically with the pin 49 within one of the vertical legs of the H shaped slot 51 for actuating the link 45 and the bell crank lever 46.

In this manner the sleeve 25 may be moved longitudinally in either of opposite directions for gradually effecting the alternate frictional engagement of the corresponding gears 14 and 15 with the driving shaft through their clutch connections therewith. A stationary internal gear 53 is formed in a portion of the casing and the vertical shaft 54 journaled concentric therewith is provided with the bevel gear 55 in engagement with the driven bevel pinion 33. A collar 56 formed with the depending eccentric bearing 57 is secured on shaft 54 and the beater shaft 58 journaled in said bearing is provided with a collar 59 and with the pinion 61 in engagement with said internal gear. Said collar is formed with a depending leg 62 terminating in a horizontal foot 63 which serves to support the preferably taper pin 64 in the axial line of the beater shaft. The lower portion of the edges of said leg are cut away at an inclined angle to form slanting shoulders 65 adjacent to the said pin.

The shank 67 of the beater 7 terminates in a lateral boss 68 formed with a hole 69 in the axial line of the beater for detachably engaging with the pin 64. The edges of said shank adjacent to the said boss terminate in inclined stops 71 adapted to engage with the shoulders 65 for automatically locking the beater in operative position on the leg of the beater shaft, when it is driven in either of opposite directions.

An important feature of the present invention resides in the arrangement of the several shafts 12, 37, 32 and 54 in the same vertical plane, whereby power is transmitted from the belt wheel 13 to the shaft 54 with a minimum of twist and tension.

It will also be noted that the drive is through meshed gears which are always in operation, either idle or driving, wherefore the mixer will operate in either direction thereby avoiding the crossing of the driving belt or other expedient to always drive the mixer in a predetermined direction.

In operation, the weight of the shifting lever when in the neutral position serves to maintain pin 49 within the recess 52 formed in the slot 51 for maintaining the sleeve 25 in slight frictional engagement with the cam lever 23 for engaging the gear 24 to turn the intermediate shaft and also the idle gears 34 and 35. Sleeve 36 with its clutch members may now be alternately engaged with the clutch members on said idle gears by corresponding longitudinal movements of said lever. The slot 51 permits the shifting lever to be moved vertically only after the complete engagement of one or the other of the gears 34 or 35 with the sleeve 36. The said lever may be then moved vertically for alternately engaging the friction cutches on the driving shaft with the gears 14 and 15.

Successive accelerated speeds may be secured for the shaft 32 and its driven connections as follows: By the engagement of 1 gears 14 and 34 with their respective shafts the lowest speed is attained through gears 14, 29, 28, and 34; by the engagement of gear 35, through gears 14, 29, 31, and 35; by the engagement of gear 15, and the reëngagement of gear 34, through gears 15, 31, 28, and 34; and by the reëngagement of gear 35 the highest speed may be attained through the gears 15, 31, and 35.

Either of the friction clutches may be engaged very gradually by means of the shifting lever and only after one of the positive clutches has been engaged thereby for avoiding the danger of breaking any of the driven parts by starting the beater under a load too suddenly, and also to avoid any splashing of the batter out of the bowl. The planetary movement of the beater may be obtained in any ordinary manner as by the engagement of a driven pinion with a fixed internal gear as shown or in any other desired manner. The beater may be detachably engaged with its shaft and maintained out of contact with the bowl and in fixed vertical relation thereto by means of a downward movement of the beater for engaging the pin 64 with the hole 69 and maintaining them in fixed vertical engagement by the engagement of one of the stops 71 with the corresponding shoulder 65 by a partial turn of the beater and there maintained by the yielding resistance of the contents of the bowl when in action. During the lateral movement of the bowl support the latch thereon being farther removed from the hinge swings clear of the leg 9 as shown by the dotted line in Fig. 3 and automatically engages with the catch on leg 8 for maintaining the support securely in lateral operative position for the insertion and operation of the beater therein.

Having fully described my improvements what I claim as my invention and desire to secure by Letters Patent of the United States is:—

1. A mixing machine having a beater and driving mechanism therefor including friction members which permit retarding of the beater, and means for varying the friction means.

2. A mixing machine having a beater and driving mechanism therefor including friction members which permit retarding of the beater, and means for varying the friction between the friction members when starting and stopping the beater.

3. A mixing machine having a beater, driving mechanism therefor including a friction clutch which permits retarding of the beater, and a hand operated controller for varying the pressure on the friction clutch.

4. A mixing machine having a beater and driving mechanism therefor including change speed gearing having meshed gears for obtaining definite speed changes, and a friction clutch for gradually changing from one speed to another speed.

5. A mixing machine having a beater and driving mechanism including means for selectively obtaining definite predetermined beater speeds, and also other means for gradually changing from one speed to another speed.

6. A mixing machine having a beater and driving mechanism therefor including means for slowly starting the operation of the beater and gradually bringing it up to a predetermined speed.

7. A mixing machine having a beater and driving mechanism therefor including means for slowly starting the operation of the beater and selectively bringing it up gradually to any one of a predetermined plurality of speeds.

8. A mixing machine having a beater and driving mechanism therefor including change speed gearing having meshed gears for obtaining definite speed changes and means for gradually stopping the operation of the beater.

9. A mixing machine having a beater and driving mechanism therefor including means for gradually starting and gradually stopping the operation of the beater.

10. A mixing machine having a beater and driving mechanism therefor including change speed gearing having meshed gears for obtaining definite speed changes and means for gradually starting and gradually stopping the operation of the beater, and also for selectively changing the speed of the beater gradually to any of a predetermined speeds.

11. A mixing machine having a beater, and driving mechanism therefor, including change speed gearing having meshed gears capable of driving operation selectively in either direction.

12. A mixing machine having a bowl, a beater, and means for imparting planetary motion to said beater including selective meshed change speed gears and friction means to permit retarding of the beater.

13. A mixing machine having a beater, and driving mechanism therefor including change speed gearing having meshed gears and also friction means to permit retarding of the beater, said driving mechanism capable of operation selectively in either direction.

14. A mixing machine having a beater, and driving mechanism therefor including change speed gearing having meshed gears and also friction means to permit retarding of the beater.

15. A mixing machine having a bowl, a beater, means for rotating said beater within said bowl, including a driving member, and change speed gearing actuated by the driving member and having meshed gears and friction means to permit unlimited retarding of the beater without interrupting the operation of the driving member.

16. A mixing machine having a bowl, a beater and driving means for the beater, and means whereby the beater may be removed and replaced without displacing the bowl or any part of the driving means and in any operative position of the beater.

17. A mixing machine having a bowl, a beater, driving means for the beater, and a separable driving connection between the driving means and the beater, said connection including a slip joint, means permitting successive upward and lateral movement of the beater when disconnecting the same, whereby the beater may be removed and replaced without displacing the bowl or any part of the driving means.

18. A mixing machine having a bowl, a beater, driving means for the beater and a separable driving connection between the driving means and the beater, said connection including an open bottom socket carried by the beater and provided with transverse shoulders at opposite sides of the socket, and a connecting member associated with the driving means and provided with a pintle rotatably embraced by the socket, there being clearance above the pintle to permit successive upward and lateral movements of the socket to remove the same from the pintle, the socket member and the connecting member having coöperating abutments to limit rotation of the socket in opposite directions, and said connecting member and socket member also having opposite transverse shoulders, the respective transverse shoulders of the connecting member overlying corresponding transverse shoulders of the socket member at opposite limits of rotation of the socket member to prevent upward movement of the socket member, and said shoulders being clear of each other in the mid position of the socket to permit upward movement thereof in removing the socket.

HERBERT HACKSTEDDE.

Witnesses:
 R. S. CARR,
 C. LEONARD.